United States Patent
Selsor

(10) Patent No.: US 8,985,413 B1
(45) Date of Patent: *Mar. 24, 2015

(54) BELT HOLDER FOR TOOL

(71) Applicant: Richard Selsor, Broken Arrow, OK (US)

(72) Inventor: Richard Selsor, Broken Arrow, OK (US)

(*) Notice: Subject to any disclaimer, the term of this patent is extended or adjusted under 35 U.S.C. 154(b) by 0 days.

This patent is subject to a terminal disclaimer.

(21) Appl. No.: 13/737,675

(22) Filed: Jan. 9, 2013

Related U.S. Application Data

(60) Division of application No. 12/924,177, filed on Sep. 22, 2010, now Pat. No. 8,387,840, and a continuation-in-part of application No. 11/728,274, filed on Mar. 26, 2007, now Pat. No. 7,802,706.

(60) Provisional application No. 60/788,600, filed on Apr. 3, 2006.

(51) Int. Cl.
| A45C 1/04 | (2006.01) |
| A45F 3/00 | (2006.01) |
| F41C 33/02 | (2006.01) |
| F42B 39/02 | (2006.01) |
| A45F 5/02 | (2006.01) |
| B23P 11/00 | (2006.01) |

(52) U.S. Cl.
CPC ............... *A45F 5/021* (2013.01); *B23P 11/00* (2013.01); *Y10S 224/904* (2013.01)
USPC ........... 224/269; 224/666; 224/667; 224/668; 224/669; 224/673; 224/904

(58) Field of Classification Search
USPC ........... 224/269, 66, 667, 668, 669, 673, 904, 224/250, 666
See application file for complete search history.

(56) References Cited

U.S. PATENT DOCUMENTS

| | | | | |
|---|---|---|---|---|
| 698,631 A * | 4/1902 | Carlisle | ............................ | 81/23 |
| 845,823 A | 3/1907 | Schmidt | | |
| 951,646 A * | 3/1910 | Lambert | ........................... | 81/23 |
| 1,326,887 A * | 12/1919 | Wood | ............................... | 24/3.1 |
| 1,910,597 A | 5/1933 | Elliott | | |
| 2,618,419 A * | 11/1952 | Vanish | ......................... | 224/666 |
| 3,104,434 A | 9/1963 | Noovdhoek | | |
| 3,384,277 A * | 5/1968 | Hodelka | ....................... | 224/242 |
| 4,106,679 A | 8/1978 | Hillinger | | |
| 4,270,587 A * | 6/1981 | Ludy | ................................. | 81/23 |
| 4,358,036 A * | 11/1982 | Maltais | ........................ | 224/667 |
| 4,638,530 A * | 1/1987 | Perry | .............................. | 24/3.12 |
| 4,645,104 A * | 2/1987 | Vokaty | .......................... | 224/673 |
| 4,746,042 A | 5/1988 | King | | |
| 4,955,518 A * | 9/1990 | Parsons et al. | ................ | 224/247 |
| 4,974,764 A | 12/1990 | Cantwell | | |
| 5,195,667 A * | 3/1993 | Gallant | ......................... | 224/197 |
| 5,248,072 A * | 9/1993 | Jones | ............................ | 224/247 |
| D345,052 S * | 3/1994 | Stokke et al. | .................. | D3/228 |
| 5,440,465 A * | 8/1995 | Hasness | ........................ | 362/191 |
| D375,240 S * | 11/1996 | Campbell | ......................... | D8/80 |
| 6,341,918 B1 * | 1/2002 | Liindberg et al. | ............. | 403/348 |
| 6,443,342 B1 | 9/2002 | Kahn | | |
| 6,641,011 B1 | 11/2003 | Kahn | | |
| 6,655,560 B2 * | 12/2003 | Kahn | ............................. | 224/268 |

(Continued)

*Primary Examiner* — Justin Larson
*Assistant Examiner* — Lester L Vanterpool
(74) *Attorney, Agent, or Firm* — George L Williamson

(57) ABSTRACT

Apparatus and method for a clip-like device for attaching the head of a hammer or like tool to the belt which is being worn about the waist of a user. Various embodiments are shown wherein the clip may be attached to the head of the hammer in various ways.

8 Claims, 3 Drawing Sheets

(56) References Cited

U.S. PATENT DOCUMENTS

| | | |
|---|---|---|
| 7,195,140 B1 * | 3/2007 | Marinelli .................. 224/222 |
| 7,802,706 B1 * | 9/2010 | Selsor ...................... 224/269 |
| 8,387,840 B1 * | 3/2013 | Selsor ...................... 224/269 |
| 2002/0117521 A1 | 8/2002 | Brandt |
| 2004/0020524 A1 * | 2/2004 | McConnell .................. 135/66 |
| 2007/0138227 A1 * | 6/2007 | Rickman .................... 224/669 |
| 2012/0061433 A1 * | 3/2012 | Johnson .................... 224/269 |

* cited by examiner

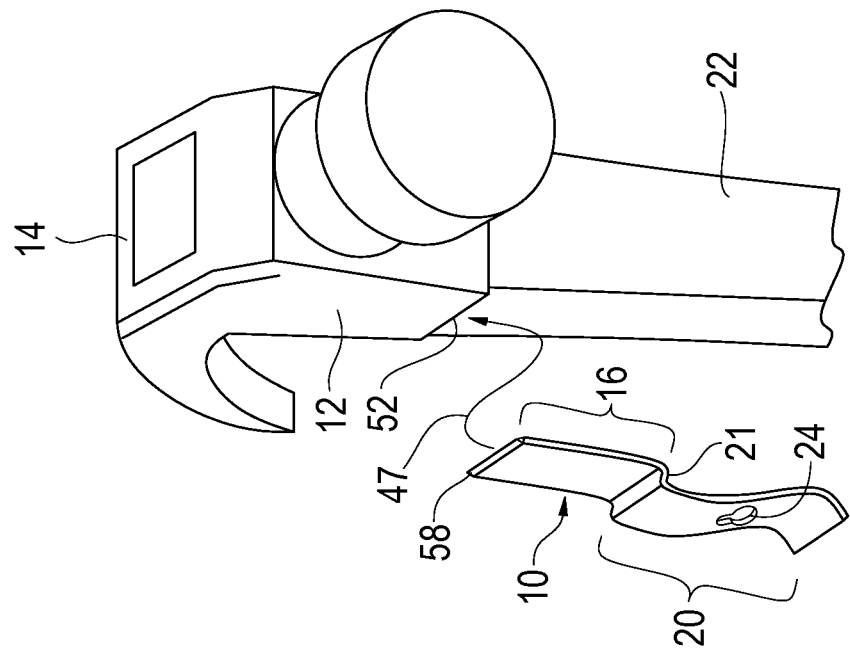
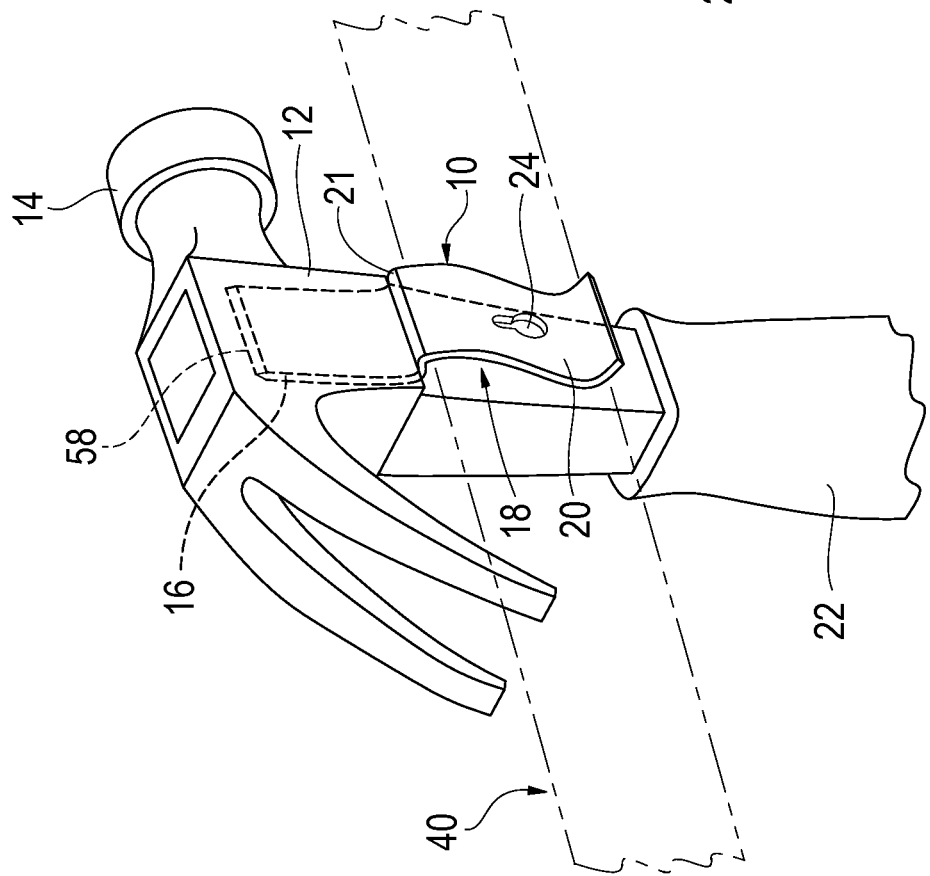

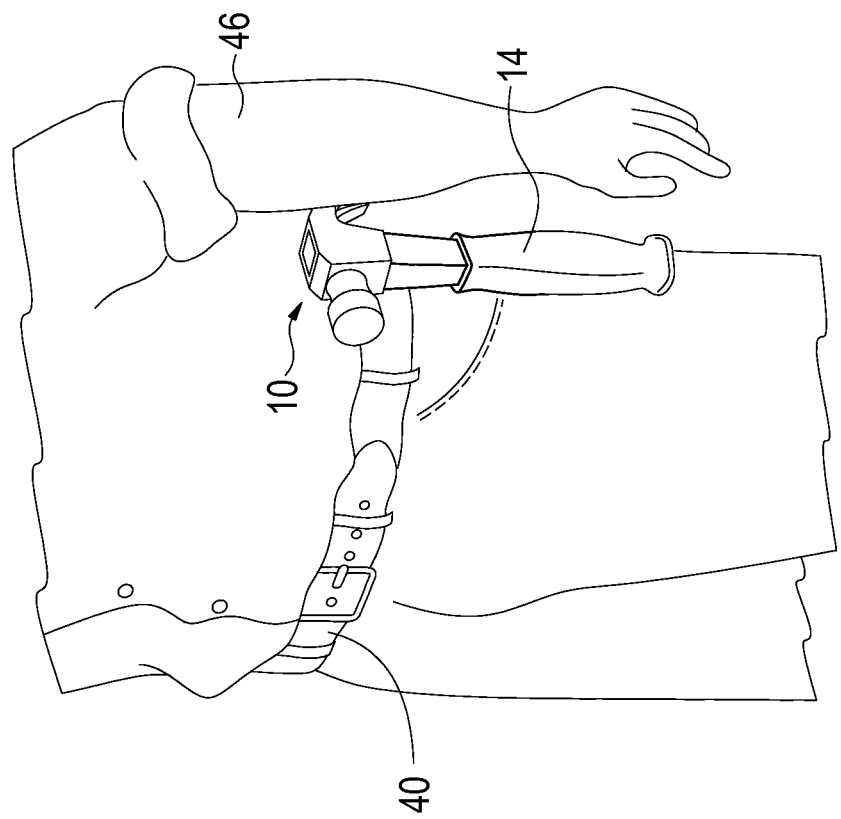
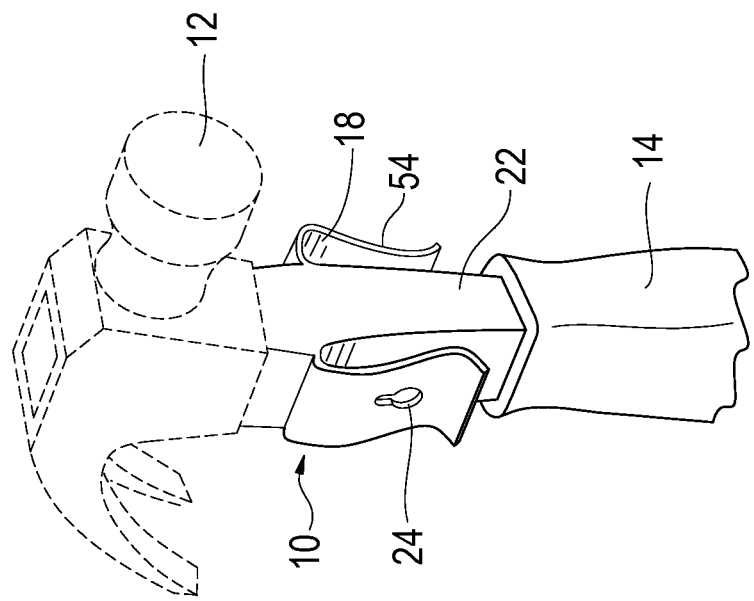
Fig. 5
Fig. 3

BELT HOLDER FOR TOOL

RELATED APPLICATIONS

This application is a Divisional of U.S. patent application Ser. No. 12/924,177 filed on Sep. 22, 2010 which was a Continuation-In-Part of U.S. patent application Ser. No. 11/728,274 filed on Mar. 26, 2007 which claimed benefit of U.S. Provisional Patent Application Ser. No. 60/788,600 filed Apr. 3, 2006.

BACKGROUND OF THE INVENTION

1. Field of the Invention

The present invention relates generally to hammers and, more particularly, is concerned with an attachment means for attaching a hammer or other tool to a belt.

2. Description of the Related Art

Tool clips/holders have been described in the related art. However, none of the related art devices disclose the unique features of the present invention.

In U.S. Pat. No. Des. 345,052 dated Mar. 15, 1994, Stokke, et al., disclosed an ornamental design for a tool clip, as shown and described. In U.S. Patent Pub. No. US 2002/0117521 A1, dated Aug. 29, 2002, Brandt disclosed a tool-toting device for connection to a belt to be worn about the waist of a tradesman for the purpose of carrying a tool. In U.S. Pat. No. 4,974,764, dated Dec. 4, 1990, Cantwell disclosed a belt clip for supporting a tool which comprises a generally U-shaped member including a curved central portion, a first and a second leg connected to the central portion and an end portion of the first leg being movably connected to the curved central portion and being directed towards the second leg. In U.S. Pat. No. 6,443,342 B1 dated Sep. 3, 2002, Kahn disclosed a tool belt tool tote device that is capable of carrying two tools independently, such as a cordless drill and a hammer. The double tool tote device comprises a C-shaped clip, a terminal swivel element and two hook elements. In U.S. Pat. No. 4,106,679 dated Aug. 15, 1978, Hillinger disclosed a tool holder particularly suited for carrying a hammer or a hatchet from a wearer's waist belt which includes a tool suspension arrangement joined to a waist belt suspended pliant pad. The tool suspension arrangement comprises a pivot rod extending normally from and joined to the pad and a protruding support element. While these tool clips/holders may be suitable for the purposes for which they were designed, they would not be as suitable for the purposes of the present invention, as hereinafter described.

SUMMARY OF THE PRESENT INVENTION

The present invention discloses a clip-like device for attaching the head of a hammer or like tool to the belt which is being worn about the waist of a user. Various embodiments are shown wherein the clip may be attached to the head of the hammer in various ways.

An object of the present invention is to allow a hammer to be worn about the waist belt of a user without the necessity of any particular type of hammer loop being on the belt. A further object of the present invention is to provide a universal clip so that any hammer can be attached to any belt being worn about the waist of a user.

Additional objects of the present invention will appear as the description proceeds.

The foregoing and other objects and advantages will appear from the description to follow. In the description reference is made to the accompanying drawing, which forms a part hereof, and in which is shown by way of illustration specific embodiments in which the invention may be practiced. These embodiments will be described in sufficient detail to enable those skilled in the art to practice the invention, and it is to be understood that other embodiments may be utilized and that structural changes may be made without departing from the scope of the invention. In the accompanying drawing, like reference characters designate the same or similar parts throughout the several views.

The following detailed description is, therefore, not to be taken in a limiting sense, and the scope of the present invention is best defined by the appended claims.

BRIEF DESCRIPTION OF THE DRAWINGS

In order that the invention may be more fully understood, it will now be described, by way of example, with reference to the accompanying drawings in which:

FIG. 1 is a perspective view of one embodiment of the present invention.

FIG. 2 is an exploded view of one embodiment of the present invention.

FIG. 3 is a perspective view one embodiment of the present invention.

FIG. 5 is an illustration of the present invention being worn on the waist belt of a user.

LIST OF REFERENCE NUMERALS

Figure 4:
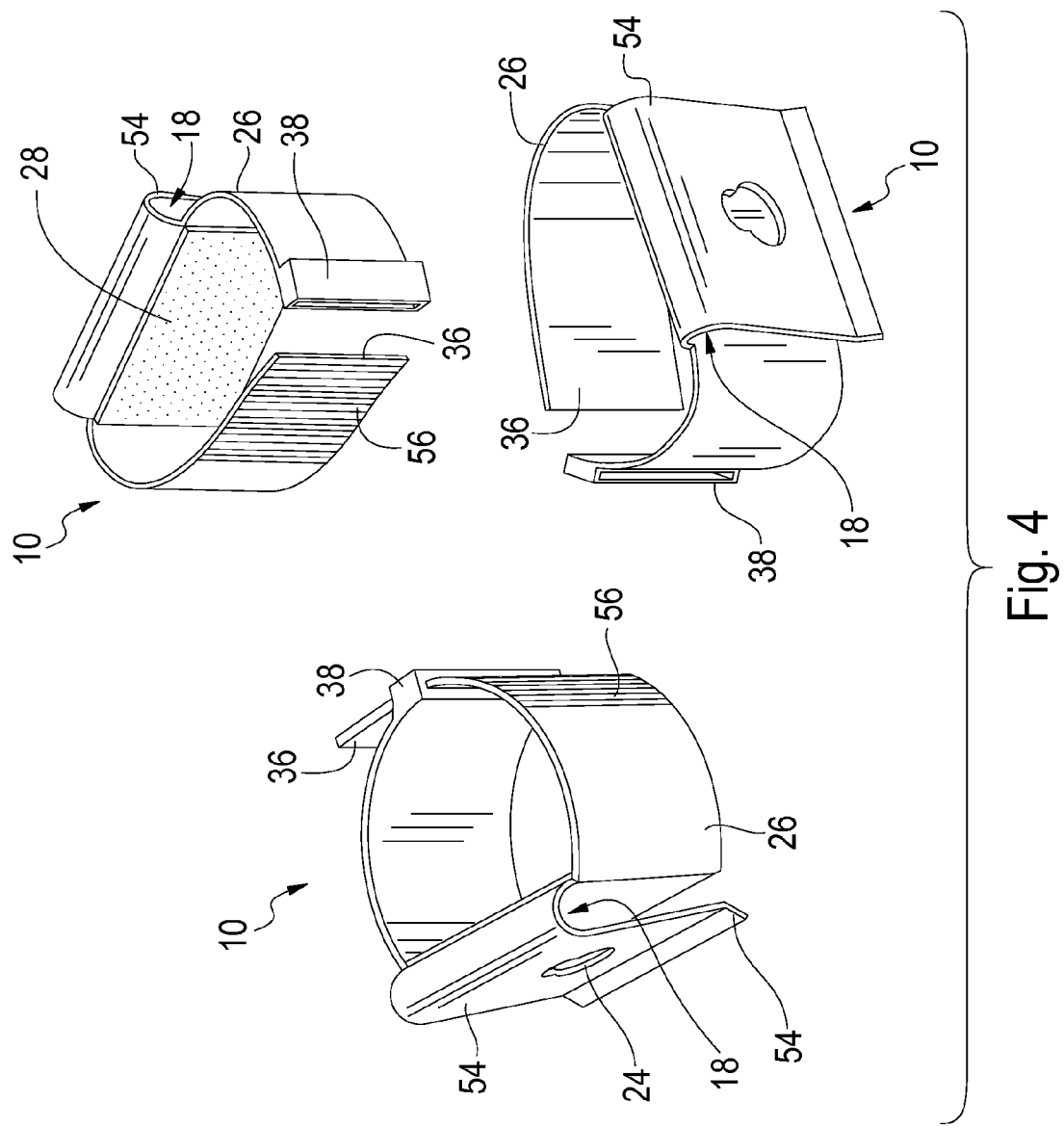
FIG. 4 is a perspective view one embodiment of the present invention.

With regard to reference numerals used, the following numbering is used throughout the drawings.

10 present invention
12 head
14 hammer
16 first portion
18 slot
20 second portion
21 flat portion
22 handle
24 key hole
26 collar
28 foam
36 male member
38 female member
40 belt
46 user
47 arrow
52 lower edge of hammer head
54 outer member
56 ridges
58 tip

DETAILED DESCRIPTION OF THE PREFERRED EMBODIMENTS

The following discussion describes in detail the present invention. This discussion should not be construed, however, as limiting the invention to those particular embodiments since practitioners skilled in the art will recognize numerous other embodiments as well. For a definition of the complete scope of the invention, the reader is directed to the appended claims. FIGS. 1-5 illustrate the present invention wherein a tool clip is disclosed for attaching a hammer or like tool to the waist belt of a user.

FIGS. 1 and 2 discloses one embodiment of the present invention 10. FIG. 1-2 discloses the present invention 10 attached to the side of the head 12 of a hammer 14 having a handle 22. The present invention 10 is a clip which can be used to attach a hammer 14 to a belt 40 being worn about the waist of a user 46 in the conventional manner as shown in FIG. 5. The present invention 10 has a first portion 16 having a tapered tip 58 thereon which first portion can be inserted either completely (i.e., its full length) or partially (i.e., only part of its length) between the hammer head 12 and the handle 22 of the hammer 14 much as a shim would be done as indicated by the arrow 47 and a second portion 20 which forms a slot 18 for receiving the top edge of a belt therein. Slot 18 is formed between the outer surface of the head 12 and the inner surface of the first portion 16. Tip 58 aids in insertion of the present invention 10. This would firmly and immovably connect the present invention 10 to the hammer 14 by inserting the first portion 16 between the wooden handle 22 and the head 12 so that the second portion 20 would be biased toward the handle due to its natural resiliency so as to firmly capture the belt 40 in slot 18. The first portion 16 is joined to the second portion 20 by a flat edge portion 21 forming a bearing surface which is expected to be disposed contiguous to the lower edge portion 52 as shown in FIG. 1. Edge portion 21 can be used to drive the present invention 10 in between the hammer head 12 and handle 22 by using the tip of a screwdriver or the like. A key hole 24 is also disclosed which would allow the hammer 14 to be hung on a nail head or the like. Note that the upper end or first portion 16 or tip 58 of the present invention 10 is oriented toward the upper end or head 12 of the hammer 14 while the lower end or second portion 20 is oriented toward the handle 22. Note that the hammer 14 may constructed in the conventional manner wherein the handle 22 is inserted into a hole or receptacle in the head 12.

Turning to FIG. 3, therein is shown the present invention 10 integrally manufactured, formed with or molded into the side of the handle 22 of the hammer 14 so as to provide a slot, clip or belt loop 18 on each side of the head 12 of hammer 14, also having a key hole 24 which would allow the hammer to be hung on a nail head or the like. An outer member 54 is shown which forms a slot 18 for receiving the top edge of a belt therein similarly to the embodiment shown in FIGS. 1 and 2. Slot 18 is formed by a downwardly U-shaped bend formed by the outer surface of head 12 and the inner surface of outer member 54 so that the belt can go thereinbetween.

Turning to FIG. 4, therein is shown the present invention 10 in the form of a plastic collar 26 similar to a cable tie or the like having male 36 and female 38 members that would fit around the handle 22 of the hammer 14 below the head 12 so as to provide a means for attaching the hammer to the belt 40 of a user. Male portion 36 and female portion 28 have interlocking ridge and groove portions (linear rack) which form an interlocking connection with the ratchet or pawl in the case (open enclosure) on the female portion when the male portion is inserted into the female portion in the conventional manner. Different sizes and thicknesses of the present invention 10 could be molded to fit the hammer or any other tool. Also shown is adhesive foam padding 28 for tightly securing the present invention 10 to the hammer 14. Key hole 24, outer member 16 and slot 18 are also shown. Slot 18 is formed by a downwardly U-shaped bend. Ridges 56 (linear rack) are also shown. The present invention 10 is effectively wide to secure the hammer 14 therein.

Turning to FIG. 5, therein is shown the present invention 10 for attaching a hammer 14 to the waist belt 40 of a user 46.

I claim:

1. An apparatus for attaching a hammer or like to a belt being worn by a user, in combination, comprising:
   a) said hammer having a head with a handle extending out from a bottom of said head;
   b) a collar wrapped around said handle below and adjacent to said head, said collar having a flat portion with foam lining only said flat portion on a side of said flat portion facing inwardly toward said handle for tightly securing the hammer;
   c) said collar having an upper edge, a clip portion extending up and around from a portion of said upper edge along said flat portion of said collar forming a slot between an outer member of said clip portion and an outer surface of said collar, said slot being closed off at a top thereof by said clip portion extending up and around from said upper edge and having a bottom opening formed by a bottom edge of said outer member and said outer surface of said collar for receiving said belt of said user;
   d) said collar having a male portion disposed on a first mating free end and a female portion disposed on a second mating free end of said collar; and,
   e) wherein said male portion and said female portion are interconnected so as to be attached to the hammer, wherein said male portion and said female portion have interlocking ridge and groove portions, wherein the clip is carried on the hammer after attachment, said hammer being suspended from said belt passing through said slot.

2. The apparatus of claim 1, further comprising said outer member having a key hole therein for hanging the hammer.

3. The apparatus of claim 1, wherein said male portion passes entirely through said female portion.

4. The apparatus of claim 1, wherein a ridge on said male portion interlocks with a pawl on said female portion.

5. A method for making a belt holder for attaching a hammer or like to a belt being worn by a user, the hammer having a head and a handle thereon, comprising the steps of:
   a) providing a collar to wrap around said handle below and adjacent to said head, said collar having a flat portion with foam lining only said flat portion on a side of said flat portion facing inwardly toward said handle for tightly securing the hammer;
   b) said collar having an upper edge, a clip portion extending up and around from said upper edge along said flat portion and forming slot between an outer member of said clip portion and forming a bottom opening into said slot at a bottom edge of said outer member and said outer surface of said collar for receiving said belt of said user;
   c) providing a male portion on a first mating free end and a female portion on a second mating free end of the collar; and,
   d) interconnecting the male portion and the female portion can be interconnected around the handle so that the handle is secured inside the collar, wherein the male portion and the female portion have interlocking ridge and groove portions;
   e) clipping said collar onto said belt of said user; and
   f) inserting said handle of said hammer into a top opening formed by said collar.

6. The method of claim 5, further comprising the step of providing a key hole in said outer member of the clip for hanging the hammer.

7. The method of claim 5, further comprising the step of passing the male portion entirely through the female portion.

8. The method of claim 5, further comprising the step of interlocking a ridge on the male portion with a pawl on the female portion.

\* \* \* \* \*